Jan. 14, 1958 B. M. BOWMAN ET AL 2,820,181

POLARIZING CIRCUIT FOR TELEVISION SIGNALS OR THE LIKE

Filed Oct. 29, 1954 2 Sheets-Sheet 1

INVENTORS B. M. BOWMAN
J. W. RIEKE

BY W. L. Keefauver

ATTORNEY

POLARIZING CIRCUIT FOR TELEVISION SIGNALS OR THE LIKE

Filed Oct. 29, 1954 2 Sheets-Sheet 2

INVENTORS B. M. BOWMAN
J. W. RIEKE
BY W. L. Keefauver
ATTORNEY

United States Patent Office 2,820,181
Patented Jan. 14, 1958

2,820,181

POLARIZING CIRCUIT FOR TELEVISION SIGNALS OR THE LIKE

Brice M. Bowman, Erie, Pa., and John W. Rieke, Basking Ridge, N. J., assignors to Bell Telephone Laboratories, Incorporated, New York, N. Y., a corporation of New York Application October 29, 1954, Serial No. 465,541

13 Claims. (Cl. 317—8)

This invention relates primarily to the transmission of television signals, although its principles are applicable to other types of signal waves.

A specific embodiment of the invention described below for illustrative purposes is termed a polarizer, since a principal function of the circuit is to monitor the polarity of a transmitted video signal and, if incorrect, to reverse the signal polarity so that a receiver will always receive a signal of the same polarity.

The illustrative embodiments described below find utility in a carrier television system employing what is known as "excess carrier ratio" modulation and the demodulation process described in a copending application of one of us, J. W. Rieke, Serial No. 332,449, filed January 21, 1953. This method of demodulation employs at the receiving end a local carrier oscillator with a control circuit to keep the frequency and phase of the local oscillator output the same as that of the signal carrier. This particular circuit, however, has an inherent 180-degree ambiguity so that when signals are first applied, the local oscillator may be controlled at the correct phase or at 180 degrees from the correct phase. The video output of the demodulator will then, with equal probability, have either correct or inverted polarity and, with equal probability, may or may not reverse its polarity at any time transmission of carrier is interrupted. Since the video signal must have the correct polarity at the receiver, some means are necessary for monitoring polarity and, if necessary, to restore proper polarity.

For a discussion of the method of modulation and demodulation just mentioned which give rise to this problem, reference may be made to the Bell System Technical Journal for July 1953 which discusses the L3 coaxial system in detail and, in particular, to the article by J. W. Rieke and R. S. Graham beginning at page 915 and entitled, "The L3 Coaxial System—Television Terminals."

It should be understood that the invention is not limited to this type of system but, instead, is applicable to the transmission of any signal whose polarity must be maintained in a particular sense and which may reverse from time to time.

A principal object of the invention is to monitor the polarity of a transmitted video signal and, if incorrect, to restore proper polarity to the transmitted signal.

Another object is to render the polarity recognizer relatively insensitive to noise bursts.

Another object is to hold the polarity-reversing means in a fixed position should there be neither picture nor synchronizing pulse information on the line.

Another object is to recognize and, if necessary, reverse polarity under either of the following two conditions: (*a*) the signal consists of synchronizing pulses only; and (*b*) the signal consists of picture information as well as synchronizing pulses.

A further object is to couple the polarity recognizer to the line without appreciable loading.

In the specific embodiment described in detail below, a set of relay contacts performs the polarity correction when necessary by reversing the connection of the balanced video input terminals to the balanced video output terminals. The polarity-recognizing circuit which controls these relay contacts is bridged on the line between the relay contacts and the output terminals to reduce susceptibility to noise surges. The recognizer itself produces an output of one character for signals of correct polarity and a distinctly different output for signals of incorrect polarity. The line relays comprise part of a start-stop relay oscillator which is energized when the recognizer output indicates incorrect polarity on the line. Immediately upon energization of the start-stop oscillator, the relay contacts reverse the polarity of the transmitted signal. The relaxation time of the relay oscillator spans several signal frames so that normally these contacts will reverse but once, since before the oscillator has completed half a cycle, the recognizer will have adjusted to indicate correct polarity. At that time, the line relays will lock up in the position they then find themselves.

The recognizer employs clipping and gating techniques based on the character of the standard (RMA) television signal to discriminate between signals of correct and inverted polarity.

A feature of the invention is that the polarity recognizer is capacitively coupled to the line, although it makes a determination based essentially on direct-current information in the video signal.

These and other features and objects of the invention may be more fully understood by considering the following detailed description when read in accordance with the attached drawings, in which.

Figure 1:
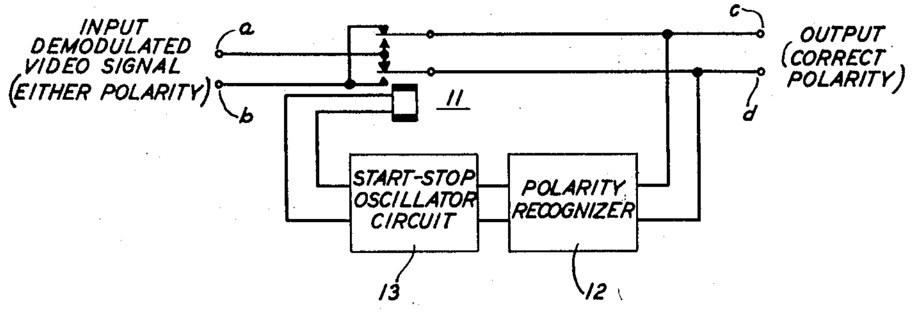
Figs. 1 and 2 illustrate by block schematic diagram two types of polarizers employing principles of the invention.

The general approach to the problem of an inverted television signal in accordance with principles of the invention is illustrated in Fig. 1. A balanced video signal, i. e., a demodulated television signal balanced with respect to ground, is applied to the balanced input terminals *a*, *b*. The applied signal will then appear at the balanced output terminals *c*, *d* with a polarity depending on the condition of the reversing relay 11 whose contacts and armatures constitute a double-pole double-throw switch by which input terminals *a*, *b* can be connected to either output terminals *c* and *d*, respectively, or to *d* and *c*, respectively.

Bridged across the line between the reversing relay and the output terminals is a polarity recognizer 12 whose function it is to monitor the polarity of the output signal and to give different indications of correct and inverted polarity. If the polarity is correct, no changes in the line terminal connections are made. If, however, the polarity recognizer senses an inverted signal, it produces an output which energizes the start-stop oscillator 13 circuit which, in turn, reverses the condition of the reversing relay 11 and thus the polarity of the signal at the output terminals. The relaxation time of the oscillator 13 is sufficiently long to permit the polarity recognizer to adjust to a signal of normal polarity at the output terminals within the time of one oscillation and thus remove the energizing input from the oscillator circuit. When the polarity recognizer indicates correct polarity, the oscillator 13 stops, and the relay will remain in whatever position it is at that time.

Since the start-stop oscillator 13 requires an energizing input, the reversing relay 11 will hold its position should there be no signal on the line.

Figure 2:
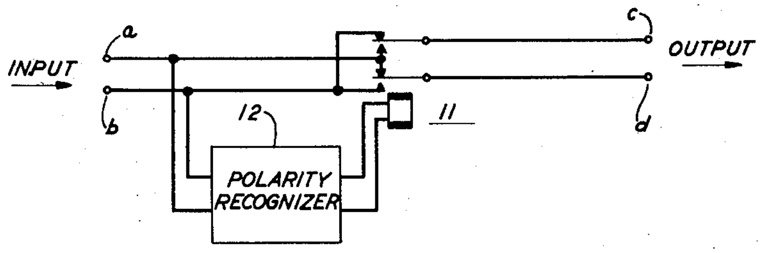

As an alternative to the reverse-acting circuit just described in which the control circuit 12—13 acts on the video line ahead of the monitoring point, a forward-acting circuit is illustrated in Fig. 2. This circuit is essentially the same as Fig. 1 except that the input of the recognizer 12 is bridged on the line ahead of the reversing relay 11.

For reasons of noise susceptibility, however, the reverse-acting circuit is preferable. In the polarity recognizer described in detail below, one of the first stages is a clipper-discriminator stage which permits examination of the video wave above a clipping level. With a reverse-acting circuit, Fig. 1, the recognizer 12 will operate with correct polarity signals at all times except for those brief instants required to detect and correct an inverted signal. The correct polarity response will include, above the clipping level, envelope variations due to the picture content of the signal and the recognizer in the reverse-acting circuit can be arranged to operate so that this type of signal is always associated with correct output polarity.

In the forward-acting case, however, the input to the recognizer 12 will, with equal probability, have either normal or inverted polarity even though the signal at the output terminals will have correct polarity. The recognizer in this case must therefore operate continuously with either normal or inverted signals. In the case of inverted input signals, even though the output signals are of correct polarity, the signal after clipping consists only of synchronizing pulses and, therefore, will contain no envelope variations. Bursts of noise will therefore have a greater tendency to induce false operation of the reversing relay. The reverse-acting recognizer, however, always operates with the white side of the signal above the clipping level, assuming blacker-than-black synchronizing pulses. The monitoring signal in the reverse-acting case, therefore, normally contains variations due to picture content, and the circuit can be designed to accept noise bursts as normal picture modulation and, therefore, will be relatively insensitive to noise.

A specific polarizer is illustrated in detail in Fig. 5, although its functional aspects will be first discussed with reference to the block diagram of the same circuit in Fig. 4.

The polarity of the video signal on the balanced video line 21 is controlled by the reversing contacts 22 which are in turn controlled by the polarity recognizer 12. The input of the recognizer is capacitively bridged on the line 21 through a pair of coupling condensers 23—24. Its first stage 25 provides amplification and, in addition, converts the balanced signal to an unbalanced signal. The second stage is a clipper-discriminator 26 which acts both as a clipper and as a pulse width discriminator. This circuit distinguishes, by differences in the peak-to-peak amplitude of its output, between correct and inverted polarity where the input signal is inverted or consists merely of synchronizing pulses. Further, the clipper-discriminator performs this function without destroying the information required to determine polarity when picture signals are also present in a signal of correct polarity.

The output of the clipper-discriminator is rectified by a rectifier 27 whose output is applied to an amplitude sensitive gate 28. The input 29 of the gate to which the output of the rectifier is applied is an enabling input, meaning that an input above a threshold value is required to cause the gate to produce an output signal. To prevent false operation of the gate when the signal polarity is correct and picture signals are present, the output of the rectifier is also applied to an amplifier 30 whose output is coupled to a second input 31 of the gate through a coupling condenser 32. Input 31 is in the nature of an inhibiting input since signals above a threshold value applied to this input will inhibit the gate and prevent its producing an output regardless of the character of the signal applied to its enabling input 29.

As will be described, the gate 28 will produce an output and operate relay K2 only when the signal polarity at the input of the recognizer 12 is incorrect. When relay K2 is operated, the start-stop oscillator 33 is energized which, by mechanical linkage, operates the reversing contacts 22 so as to correct the signal polarity at the output terminals *c, d*. This also corrects the polarity of the signal at the input of the recognizer 12 to the end result that the energizing input of the start-stop oscillator is removed and it ceases oscillation.

Figure 3:
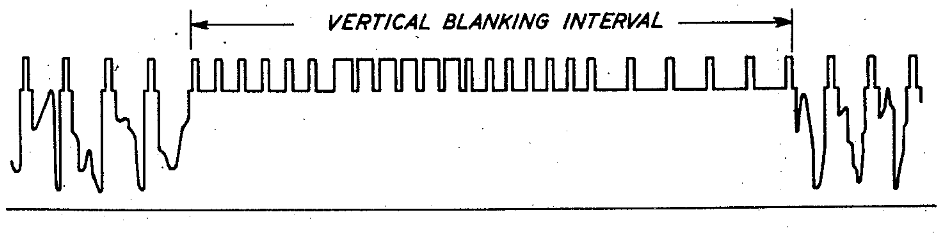
Fig. 3 illustrates the standard RMA television wave form.

The operation of this circuit is based on the character of the standard RMA television signal which is illustrated in Fig. 3.

With incorrect signal polarity, the synchronizing pulses at the input of the clipper-discriminator are in the positive direction, and the output of the clipper-discriminator will consist of a continuous series of pulses regardless of the presence of picture signals. These pulses will have a constant amplitude and, for purposes of discussion, will be taken as having unity amplitude.

With normal video polarity and in the absence of any picture signals, the output of the clipper will again be a continuous series of pulses, but the peak-to-peak amplitude in this case will be about one half. This change in amplitude results from the difference in duty-cycle or average value when the synchronizing pulses are inverted. The clipper, therefore, gives two distinctly different signals for correct and inverted polarity when no picture signals are present. The differential between these two outputs is large enough to cause the gate 28 to respond to inverted signals but not to normal polarity signals consisting of synchronizing pulses only.

A video signal of correct polarity and including picture information as well as synchronizing pulses will, however, produce at the output of the clipper-discriminator under some conditions an output approaching unity. Were no means taken to prevent it, such an output would give a false response and improperly reverse the line connections. Due to the nature of the television signal, however, the output of the clipper-discriminator in the presence of such signals contains additional information which makes it possible to prevent such false operation. This information is in the form of alternating-current variations in the rectified output of the clipper-discriminator which, when amplified by amplifier 30 and capacitively coupled to the inhibiting input 31 of the gate, inhibit the latter. When the signal is of inverted polarity, the output of the clipper comprises synchronizing pulses only which, when rectified, produce a substantially direct-current output, particularly in so far as the time constant of condenser 32 is concerned. Due to this condenser, therefore, rectified synchronizing pulses have no effect on the inhibiting input 31 of the gate 28.

Three conditions are therefore satisfied: (1) when no signals are on the line, the start-stop oscillator 13 holds the reversing contacts in position; (2) when synchronizing pulses only are on the line, the clipper-discriminator produces output voltages for correct and inverted polarity signals which differ sufficiently to permit correct and reliable operation of the reversing circuit; and (3) when normal polarity signals including picture information are on the line, the reversing circuit is inhibited; this inhibition is removed in the case of an inverted signal regardless of the presence of picture information.

Figures 4, 5:
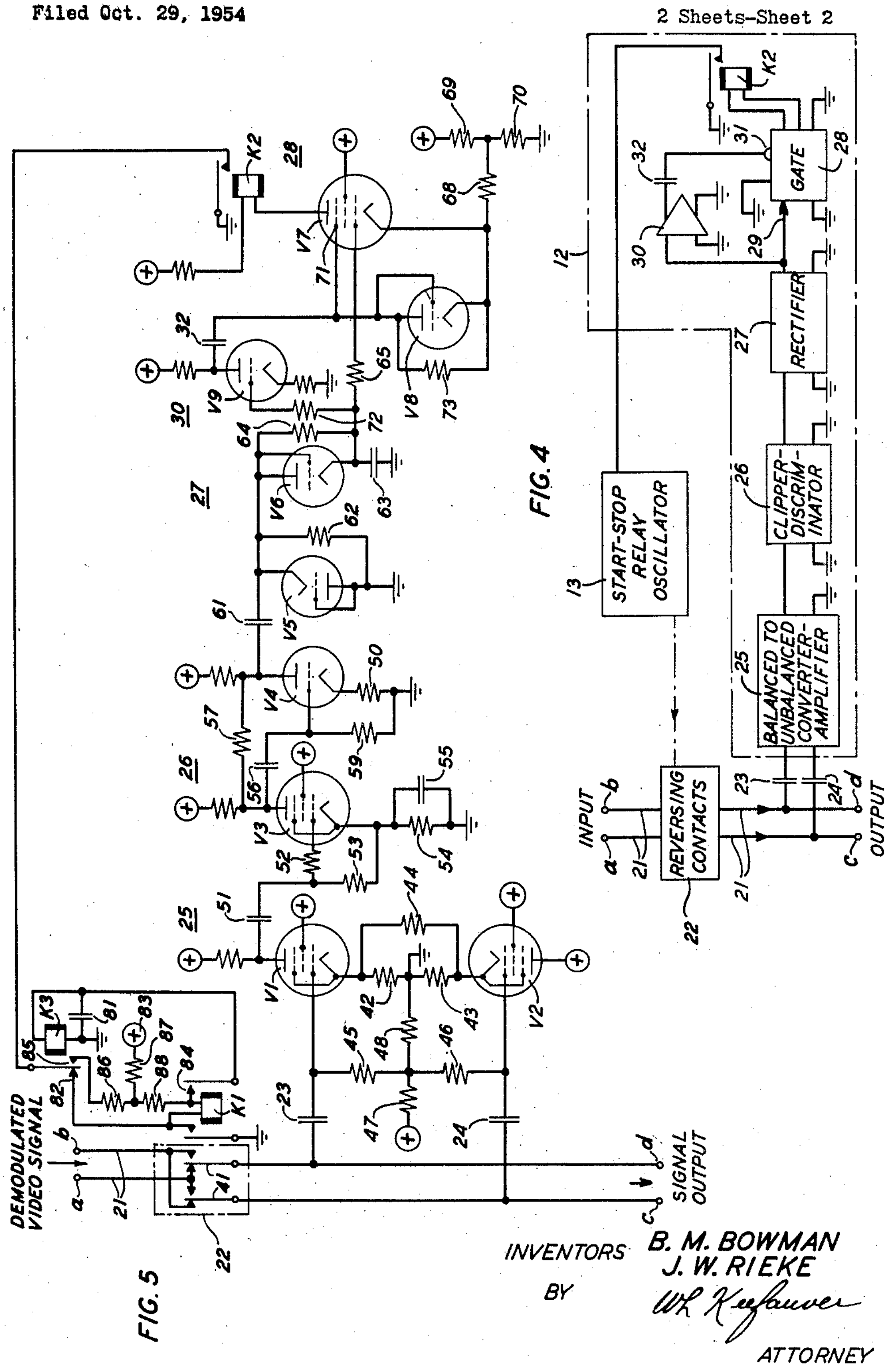
Fig. 4 is a block schematic diagram of a specific polarizer of the reverse-acting type also employing principles of the invention.
Fig. 5 is a detailed circuit schematic diagram of a polarizer of the type illustrated by block diagram in Fig. 4.

The circuit for performing these functions is illustrated in detail in Fig. 5. The balanced video signal enters the circuit at terminals *a, b* and leaves on terminals *c, d* after passing through a reversing switch comprising the armatures 41, and associated contacts, of relay K1. The control grids of vacuum tubes V1 and V2 are bridged on the output terminals *c*, *d* through a pair of coupling condensers 23—24. These two tubes constitute a balanced-to-unbalanced video amplifier with high longitudinal suppression, the circuit, in fact, being a variation of one disclosed in a patent of S. Doba No. 2,226,238 dated December 24, 1940. The cathode resistors 42 and 43 which are bridged by a third resistor 44 supply degenerative feedback and also the large suppression to longitudinal currents which is necessary to discriminate between metallic and longitudinal currents. The cathodes are elevated above ground by these resistors so that the control grids are also biased positively, being returned through individual resistors 45 and 46 to a voltage divider 47—48 to which a positive voltage is applied.

No output is taken from the lower tube V2 but only from the upper tube V1. Output from V1 is applied through a coupling condenser 51 and a series grid resistor 52 to the control grid of tube V3 which acts both as a clipper and as a pulse width discriminator. This tube operates with a normal plate voltage but with a subnormal screen voltage to provide clipping at desirably small signal levels. The control grid is returned through the resistor 52 and a second resistor 53 to the cathode which is connected to ground through a resistor 54 bypassed by a condenser 55.

Figure 5A:
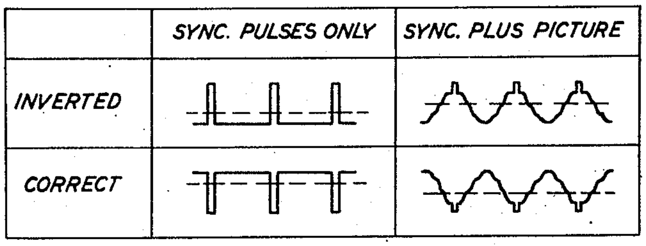
Fig. 5A shows wave forms illustrative of the Fig. 5 circuit.

Four types of signals may be present at the input of tube V3—signals of correct polarity consisting of either synchronizing pulses only or having picture signals also, or signals of incorrect polarity consisting of synchronizing pulses only or having picture signals as well. Tubes V1 and V2 receive signals from the "ring" and "tip" sides of the balanced line 21, respectively, so that at the grid of V3, the synchronizing pulses extend in the positive direction for inverted signals and in the negative direction for signals of correct polarity. This is illustrated in Fig. 5A, which shows the four types of signals mentioned above.

The condenser 51 acts to center all signals at a direct-current voltage of zero; and since tube V3 receives bias only from the signals, the grid of this tube will swing positive and negative with respect to its cathode about the zero axis of the input signals. The zero axis of each type of signal is indicated in Fig. 5A, from which it may be seen that the signals above cut-off applied to V6 will consist of narrow positive pulses in the case of an inverted signal of either type and broad positive pulses of a much lower amplitude in the case of correct polarity signals consisting of synchronizing pulses only. The peak-to-peak output of V3 will therefore be much greater in response to inverted signals. This stage, therefore, acts as a pulse width discriminator since it produces distinctly different outputs in response to broad and narrow input pulses. It also serves as a clipper since, by proper selection of resistor 52, it clips substantially all of the picture signals from inverted signals which contain picture information. These are both necessary functions, as will be seen.

The output of V3 in response to correct polarity signals containing picture information will be relatively unpredictable as to amplitude and may, in fact, be the same as for inverted signals. This may occur, for example, where the picture consists of a vertical white bar on a black background. This output will, however, be unique in at least one respect since it will contain video frequency components which, due to the clipping action of V3, will occur only in response to this type of signal. It is this fact which is utilized to inhibit the reversing circuit, should the reversing circuit be unable to distinguish on an amplitude basis alone between correct and inverted signals.

It may be noted that the series grid resistor 52 has a much smaller value than does the grid leak resistor 53. In one embodiment R52 was 27,000 ohms while R53 was .47 megohm. A condenser 51 of .1 microfarad was used in this embodiment. The series resistor aids in establishing the clipping level so as to reject all picture components in the case of inverted signals. It also makes the charging time constant of the condenser 51 sufficiently long with respect to the synchronizing pulse rate to prevent its acquiring any appreciable charge which would tend to reduce the difference in the peak-to-peak output of V3 in response to inverted and correct polarity signals.

The output of the clipper-discriminator 25 is coupled through a condenser 56 to the control grid of an inverting tube V4 which reverses the polarity of the signal. The plates of V3 and V4 are coupled through a resistance 57 which supplies a large amount of negative feedback. The purpose of this feedback is to provide a low driving impedance for the diode stages V5 and V6 which follow. Grid bias for this tube is developed across the small-valued resistor 50, while resistor 59 is a conventional grid leak resistor.

The first of these diodes, which are actually diode-connected triodes, together with capacitor 61 and resistor 62 comprises a direct-current restorer. The second diode-connected triode V6 is a rectifier or detector which develops a voltage across condenser 63 which is equal in amplitude to the peak-to-peak value of the output wave of the inverter tube V4. Tubes V5 and V6, in fact, constitute a peak-to-peak detector. The time constant of resistor 64 and condenser 63 is such that the voltage on the condenser 63 will remain substantially constant for all conditions of polarizer input signal except a video signal of the correct polarity which includes picture information. In other words, it will remain substantially constant for rectified signals consisting of synchronizing pulses only. When the signal at the output of V4 contains picture components, as it may only for a signal of correct polarity, the voltage on condenser 63 will decay appreciably during the vertical blanking interval and possibly, depending upon the picture content, during part of the picture time interval. The voltage on this condenser will therefore have a low frequency alternating-current component for a normal polarity signal including picture information which will not be present for the inverted signal.

The final stage comprises a pentode connected as a gate having an enabling input which is amplitude sensitive and an inhibiting input associated with a circuit which, in effect, is frequency sensitive. The voltage on the condenser 63 is direct-current coupled to the control grid of this tube through a resistor 65. The cathode of the gating tube V7 is raised to a positive voltage by the connection through a resistor 68 to a point on the voltage divider 69—70. With no input voltage, this tube is thereby cut off.

Plate voltage for tube V7 is supplied through the winding of a relay K2, and the suppressor grid is returned to the cathode through a diode-connected triode V8. If the suppressor grid 71 is at cathode potential and the control grid has a large positive direct-current input from the condenser 63, the gating tube V7 will conduct and operate relay K2. The direct-current voltage on condenser 63 is sufficient to overcome the positive cathode bias only for inverted signals or for normal signals including picture information.

False operation of the gate under the latter condition is prevented, however, by coupling the voltage on the condenser 63 through a resistor 72 to the grid of a vacuum tube V9. This tube is essentially an alternating-current amplifier whose only output, due to condenser 32, is the alternating-current component on the condenser 63 in the case of a normal polarity signal including picture information. Diode V8, in combination with resistor 73 and condenser 32, acts as a direct-current restorer for the output of V9 so that the positive peaks assume a direct-current value equal to the normal suppressor grid bias, and all other portions of the output of the tube V9 become negative with respect to this bias. This negative voltage on the suppressor grid of the tube is sufficient to render this tube inoperative in spite of any positive voltages which may be applied to the control grid via resistor 65.

Relay K2, therefore, operates only in response to a signal of inverted polarity.

Relays K1 and K3 constitute a start-stop relay oscillator whose period is controlled by the condenser 81 which shunts the winding of relay K3. (This relay oscillator forms the subject matter of J. W. Rieke application Serial No. 465,542, filed of even date herewith.) When relay K2 is operated, it connects ground to the winding of relay K1 through a back contact 82 on relay K3 and causes relay K1 to immediately operate. Relay K1, in operating, reverses the signal polarity at the output terminals by the action of armatures 41 associated with the reversing contacts 22. It also operates relay K3 by applying battery 83 to the winding of relay K3 through a back contact 84 on relay K1. The operation of relay K3 is delayed by the time required to charge up the condenser 81 to a value sufficient to operate relay K3. Relay K3, in operating, effectively removes battery 83 from relay K1 by applying ground from relay K2 over its front contact 85. K1 in releasing removes battery from K3, but K3 will remain operated until the condenser 81 discharges. As soon as relay K3 releases, K1 will again be operated and the cycle will repeat itself. This process will continue until relay K2 is released, at which time relay K1 will remain in whichever position it is at the instant of release of relay K2, and relay K3 will follow up and also assume the same position as relay K1. It will be noted that relay K3 is, in effect, following the operations of relay K1 although delayed by the time required to charge and discharge the condenser 81. For example, when K1 is operated, K3 is also operated after the time interval required to charge the condenser 81; and when K1 is released, K3 is also released after a time interval required to discharge condenser 81.

In most instances, relay K1 will reverse, i. e., operate or release, just once or not at all, depending upon the input signal polarity, since the charging and discharging time of the condenser 81 spans several frames of the video signal. This is sufficient time for the recognizer circuit to adjust to correct polarity and release relay K2 before relay K1 can reverse a second time. With the oscillating feature possible, however, the circuit will quickly restore correct polarity on the line should a noist burst or the like induce false operation of the reversing relay. In any case, relay K1 will continue to reverse the line connections until correct polarity is restored.

Provision may be made, if desired, to operate relay K2 manually so as to reverse the line connections.

Although the invention has been described as relating to specific embodiments, the invention should not be deemed limited to the embodiments illustrated, since various modifications and other embodiments will readily occur to one skilled in the art.

What is claimed is:

1. In combination, a source of signals of either correct or inverted polarity for which correct polarity is desired, controllable means for reversing the polarity of inverted signals, means for transmitting said signals through said controllable means, means connected to the output of said controllable means for monitoring the polarity of said signals comprising means for deriving control signals of a first kind in response to signals of correct polarity and means for deriving control signals of a second kind which are distinctly different from said first kind in response to inverted signals, means for applying said control signals to said controllable means to control the same, and said controllable means controllable to reverse the polarity of said signals only in response to control signals of said second kind.

2. In combination, a source of television signals, including picture signals and synchronizing pulses, of either correct or inverted polarity, an electrical circuit including controllable means for reversing the polarity of applied signals, means for applying said television signals to said electrical circuit, polarity monitoring means, means for applying television signals in said electrical circuit to said polarity monitoring means, said polarity monitoring means comprising means responsive to the polarity of said synchronizing pulses for deriving control signals which differ markedly in amplitude for pulses of correct polarity and pulses of inverted polarity, an electronic gating circuit biased to produce an output only in response to control signals above a predetermined threshold value, means for deriving an inhibiting signal from picture signals of correct polarity only and means for applying said inhibiting signals to said gating circuit to inhibit its producing an output regardless of said control signals, and means for applying the output of said gating circuit to said controllable means to control the polarity reversal of the said television signals applied to said electrical circuit.

3. The combination in accordance with claim 2 wherein the said means for applying television signals to said polarity monitoring means comprises means for applying signals from the output of said electrical circuit to said polarity monitoring means.

4. In combination, a source of television signals of either polarity, said television signals comprising picture signals of varying amplitude and synchronizing pulses of a fixed amplitude, a transmission line including switching means for controlling the polarity with which signals applied to the input of said transmission line appear at the output of said transmission line, means for applying said television signals to the input of said transmission line, and means for controlling said switching means comprising a polarity monitoring circuit connected to receive television signals from the output of said transmission line, said monitoring circuit comprising pulse width discriminator means for producing an output signal whose amplitude is proportional to the width of signal components above a predetermined level, rectifying means having a time constant which is long relative to the said synchronizing pulses but which is short relative to the higher frequency components of said picture signals, means for applying said output signal to said rectifying means, an amplitude-sensitive translating circuit, means for applying the output of said rectifying means to said translating circuit, said translating circuit adapted to pass only applied signals above a threshold level intermediate the level of rectified synchronizing pulses of correct polarity and rectified synchronizing pulses of inverted polarity, inhibiting means for preventing said amplitude-sensitive translating circuit from passing any applied signals when inhibited, said inhibiting means comprising a second translating circuit connected between said rectifying means and said amplitude-sensitive translating circuit and having a transmission characteristic which passes rectified picture signals to the substantial exclusion of rectified synchronizing pulses, and means for controlling said switching means in response to the output of said amplitude-sensitive translating circuit.

5. In combination, a source of television signals of either polarity, said television signals comprising picture signals of varying amplitude and synchronizing pulses of a fixed amplitude greater than any of said picture signals, a transmission line including controllable switching means for controlling the polarity with which signals applied to the input of said transmission line appear at the output of said transmission line, means for applying said television signals to the input of said transmission line, and means for controlling said switching means comprising a polarity monitoring circuit having its input bridged on the output of said transmission line, said monitoring circuit comprising a clipper biased to pass only applied signals above a clipping level which, for inverted signals, is greater than the amplitude of said picture signals but less than the amplitude of said synchronizing pulses, a rectifying circuit connected to the output of said clipper and having a time constant which is long relative to said synchronizing pulses but short relative to said picture signals, amplitude-sensitive gating means having an enabling input and an inhibiting input, a direct-current coupling circuit connected between the output of said rectifying circuit and said enabling input, means for biasing said gating means conductive for rectified synchronizing pulses of inverted polarity and non-conductive for rectified synchronizing pulses of correct polarity, means for inhibiting conduction by said gating means in response to rectified picture signals of correct polarity which may be passed by said clipper, said inhibiting means comprising a circuit substantially opaque to the transmission of rectified synchronizing pulses of either polarity connected between the output of said rectifying means and said inhibiting input, and means responsive to conduction by said gating means for operating said switching means to reverse the signal polarity at the output of said transmission line.

6. The combination in accordance with claim 5 wherein said transmission line comprises a balanced transmission line and wherein said switching means comprises a relay having contacts and armatures connected in said transmission line as a double-pole double-throw switch.

7. The combination in accordance with claim 6 wherein said relay is responsive to the conduction of said gating means to alter its condition from operated to released, or vice versa.

8. The combination in accordance with claim 5 wherein said gating means comprises a space discharge device having a control grid and a suppressor grid, wherein said enabling input comprises said control grid and said inhibiting input comprises said suppressor grid.

9. The combination in accordance with claim 5 wherein said clipper comprises an amplifying device having zero bias in the absence of applied signals and means for removing direct-current components from signals applied to said device.

10. A polarity recognizer for television signals having synchronizing pulses of a fixed amplitude and picture components of variable amplitude: said recognizer comprising a pulse width discriminator, capacitive coupling means for applying said signals to said discriminator, said discriminator producing output signals of distinctly different peak-to-peak amplitudes in response to applied synchronizing pulses of a first polarity and applied synchronizing pulses of the opposite polarity, means for biasing said discriminator beyond cut-off for the picture components in signals of said first polarity, amplitude-sensitive gating means responsive to the peak-to-peak amplitude of the output of said discriminator, and means for biasing said gating means to pass only applied signals of an amplitude greater than a threshold value intermediate said distinctly different peak-to-peak amplitudes.

11. The combination in accordance with claim 10 and an inhibiting circuit connected between the output of said discriminator and said gating means, said inhibiting circuit including frequency selective means passing only frequencies greater than the output of said discriminator which results from synchronizing pulses only, whereby said gating circuit is inhibited in response to picture signals which pass through said distcriminator.

12. The combination in accordance with claim 10 wherein said pulse width discriminator comprises an amplifying device having at least a control grid and a cathode, means for establishing the potential of said grid, in the absence of applied signals, at the potential of said cathode comprising a grid return resistor connected between said grid and said cathode, and wherein said first-named biasing means comprises a second resistor connected in series with said grid in a circuit including said grid, said grid return resistor, and said cathode.

13. In combination, a source of signals of either a first or second polarity, controllable means for reversing the polarity of signals of said second polarity, means for transmitting said signals through said controllable means, means for monitoring the polarity of said signals and for deriving control signals indicative of the polarity of the monitored signals, start-stop oscillator means which start and continue oscillation in response to control signals indicative of monitored signals of said second polarity only, means for applying said control signals to said start-stop oscillator means, and said controllable means comprising switching means responsive to oscillations of said oscillator for reversing the polarity of signals applied to said controllable means.

References Cited in the file of this patent

UNITED STATES PATENTS

| | | |
|---|---|---|
| 2,689,939 | Godshalk | Sept. 21, 1954 |
| 2,699,529 | Wenk | Jan. 11, 1955 |